United States Patent
Surlaker et al.

(10) Patent No.: US 7,386,615 B1
(45) Date of Patent: Jun. 10, 2008

(54) METHOD AND SYSTEM FOR RELIABLY DE-ALLOCATING RESOURCES IN A NETWORKED COMPUTING ENVIRONMENT

(75) Inventors: Kapil Surlaker, Mountain View, CA (US); Sreenivas Gollapudi, Cupertino, CA (US); Lakshminarayanan Chidambaran, Fremont, CA (US); Debashis Saha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 485 days.

(21) Appl. No.: 10/144,246

(22) Filed: May 10, 2002

(51) Int. Cl.
*G06F 15/173* (2006.01)

(52) U.S. Cl. .................. 709/226; 709/226; 709/222; 709/228; 714/2; 714/4; 714/48; 714/100

(58) Field of Classification Search ................ 718/104; 709/226–227, 222; 714/4, 2, 48, 100
See application file for complete search history.

(56) References Cited

U.S. PATENT DOCUMENTS

| | | | | |
|---|---|---|---|---|
| 5,421,004 A | * | 5/1995 | Carpenter et al. | 714/25 |
| 5,764,915 A | * | 6/1998 | Heimsoth et al. | 709/227 |
| 5,996,086 A | * | 11/1999 | Delaney et al. | 714/4 |
| 6,012,152 A | * | 1/2000 | Douik et al. | 714/26 |
| 6,230,200 B1 | * | 5/2001 | Forecast et al. | 709/226 |
| 6,338,089 B1 | | 1/2002 | Quinlan | |
| 6,363,421 B2 | * | 3/2002 | Barker et al. | 709/223 |
| 6,397,253 B1 | | 5/2002 | Quinlan et al. | |
| 6,859,830 B1 | * | 2/2005 | Ronneburg et al. | 709/224 |
| 2002/0198943 A1 | * | 12/2002 | Zhuang et al. | 709/206 |

* cited by examiner

*Primary Examiner*—William Thomson
*Assistant Examiner*—Phuong N Hoang
(74) *Attorney, Agent, or Firm*—Bingham McCutchen LLP (57) ABSTRACT

A system and method is disclosed that allows resources to be shared among multiple entities, but which can appropriately release system resources after the failure or shutdown of the calling entity. In one approach, a monitoring entity is available to check for session failures. If a session failure is detected, the session is identified in a shared list that is accessible to other related entities. The related entities can be configured to piggyback a message to an appropriate node to kill, shutdown, or release resources associated with the failed session. Alternatively, a related entity can be specifically initiated to send a message to the appropriate node to kill, shutdown, or release the resources.

40 Claims, 8 Drawing Sheets

METHOD AND SYSTEM FOR RELIABLY DE-ALLOCATING RESOURCES IN A NETWORKED COMPUTING ENVIRONMENT

BACKGROUND AND SUMMARY

The present invention relates to a method and system for implementing computing systems that perform work in a networked environment. To enable communications between two networked computing nodes, a physical pathway must exist between the two nodes. This physical pathway may exist, for example, as a networking infrastructure comprising either wired or wireless networking components. In addition, some type of logical pathway may be created over the physical pathway to carry messages between the two nodes. The logical pathway, often termed a "connection", is a communications pathway between an entity on a first node and an entity on a second node that may be established using available inter-process communications mechanisms.

In one approach to implementing a networked computing environments, an entity on the first node that seeks to communicate with a second node will initiate and maintain a dedicated connection between the two nodes. In this approach, the connection is a dedicated resource that can only be used by the entity that is associated with it. Other resources opened at the remote node because of this connection may also be configured as dedicated resource. One advantage with this approach is that since the dedicated resources are closely tied to the specific entity that initiates these resources, the shutdown or failure of that entity allows easy/automatic identification and cleanup of those resources. This reliably frees up those resources to be used by other entities on the system after the shutdown or failure of the entity that initiates the dedicated resources.

A disadvantage with this approach is that since the resources are dedicated to a single entity, other entities that wish to communicate between the same two nodes must initiate their own dedicated connections. This could be inefficient since the connections/resources are not always in active use by their associated entities, but being dedicated resources, cannot be shared with other entities even if idle. Moreover, on most systems, there is a limit upon the number of available connections that may be simultaneously opened. If every entity must open its own dedicated connections/resources, then the limited supply of available connections/resources may be a bottleneck that restricts the amount of work performed at the computing system.

To address this problem, a computing system could allow non-dedicated connections that are de-coupled from the entities that make use of these connections. In this approach, multiple entities may share the same set of connections between a first node and a second node. By de-coupling the calling entity from the connection, any connection initiated by another entity, if idle, may be used by other entities having the requisite authority to share the non-dedicated connection.

However, because resources are now de-coupled from their calling entity, it is possible that the failure or shutdown of the calling entity may not result in the automatic release of some or all of those resources. These "zombie" resources may continue to exist long after the shutdown or failure of the specific entity that initiates the resources. Each such resource consumes a quantity of system resources that is therefore not available to be used by others for useful purposes. Over time, the number of extraneous resources that exist in the computing system could cause a significant decrease in system efficiency.

Accordingly, a system and method is disclosed that allows resources to be shared among multiple entities, but which can appropriately release system resources after the failure or shutdown of the calling entity. In one embodiment, a monitoring entity is available to check for session failures. If a session failure is detected, the session is identified in a shared list that is accessible to other related entities. The related entities can be configured to piggyback a message to an appropriate node to kill, shutdown, or release resources associated with the failed session. Alternatively, a related entity can be specifically initiated to send a message to the appropriate node to kill, shutdown, or release the resources.

Further details of aspects, objects, and advantages of the invention are described in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION OF EMBODIMENT(S)

A system and method is disclosed that allows resources to be shared among multiple entities, but which can appropriately release system resources after the failure or shutdown of the calling entity.

To describe the below embodiment(s) of the invention, it is useful at this point to introduce certain terminology that will be hereinafter employed. A "user process" refers a computing entity that that is created to run a user program. Additional processes may be created to run or execute other types of programs and work in the computing system. As will be recognized by those skilled in the art, other such entities, e.g., threads and tasks, may also be usefully employed in place of processes. A "connection" refers to a communications pathway between two or more nodes, which may be used to communicate between a process on a first node and a program instance on a second node. The program instance may be implemented as one or more processes. A "session" refers to a specific connection of a user to a program instance, e.g., through a user process that is initiated by providing a valid username and password. In one embodiment, a session is established for a user that normally lasts from the time the user connects until the time the user is disconnected or exits from the program instance.

Figure 1:
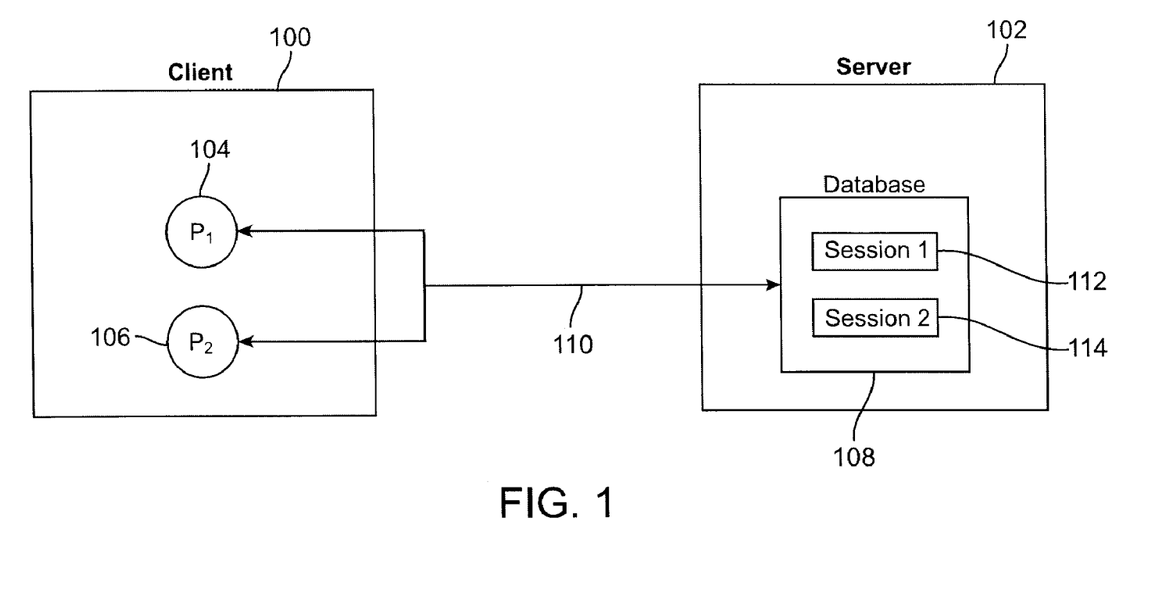
FIG. 1 illustrates connection pooling according to one embodiment of the invention.

FIG. 1 shows an overview diagram of a computing system that allows shared connections or "connection pooling" according to one embodiment of the invention. Client 100 includes two separate user processes 104 and 106. Remote server node 102 includes an application instance 108. For purposes of this example, it is assumed that application instance 108 is a database instance. A shared connection 110 exists to allow communications between client 100 and server node 102. Each user process 104 and 106 intercommunicates with server node 102 using shared connection 110. Upon a connection by user process 104, a first session 112 is established at server node 102. Upon a connection by user process 106, a second session 114 is established at server node 102.

Figure 2:
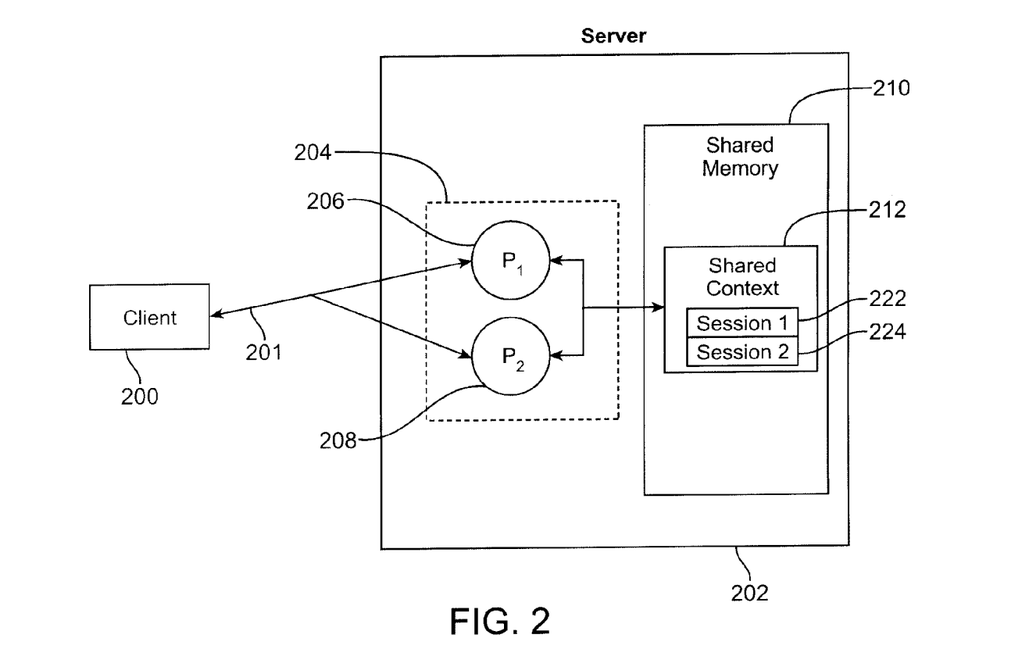
FIG. 2 illustrates process pooling according to one embodiment of the invention.

FIG. 2 shows an architecture for implementing connection pooling according to one embodiment of the invention. In this approach, a user session is not tied to a single dedicated process or connection; instead, each process in a process pool is capable of handling a session for a user over shared connections. When a user at a client accesses a server node, one of the available processes in the process pool is assigned to that user for any immediate work that must be performed. Any suitable connection, even a non-dedicated connection, can be employed by the client to communicate to the server. When the assigned process from the process pool has finished its immediately assigned work on behalf of the instant user, the process is released back to the process pool to be available to handle work on behalf of another user. In this way, specific resources, such as connections and server processes, are de-coupled from particular users and user processes.

As illustrated in FIG. 2, a process pool 204 is established at the server 202 comprising a first process 206 and a second process 208. Each process 206 and 208 in process pool 204 is capable of handling work for users from client 200 that submit work requests over connection 201, or any other shared connection. To allow different processes 206 and 208 in a process pool 204 to handle work on behalf of multiple sessions, a shared memory 210 is configured that is accessible by the process 206 and 208. Shared memory 210 includes a shared context region 212 that contains session context information for each session being handled by the processes in process pool 204.

As each new session is established at server 202 by a process in process pool 204, context information for that new session is maintained in shared context 212. For example, session context information 222 and 224 are maintained in shared context region 212 for two user sessions established from client 200. When either process 206 or process 208 is assigned to perform work on behalf of a particular session, that assigned process accesses the corresponding session context information 222 or 224 in the shared context region 212 to begin performing work for that user session. Because the session context information is stored in a shared context area, that context information can be accessed by any process in the associated process pool. In this manner, a session can be handled by any of the processes in the process pool 204.

In an embodiment, if a first session was created by a first process and a second session created by a second process, then either session can be serviced by either process in the shared pool. However, in certain systems, the cleanup activities for a session are controlled by the creating process. With process pools, this relationship can be removed, with cleanup being controlled by the process pool, e.g., both sessions will stay alive as long as the process pool is alive.

Figure 3A:
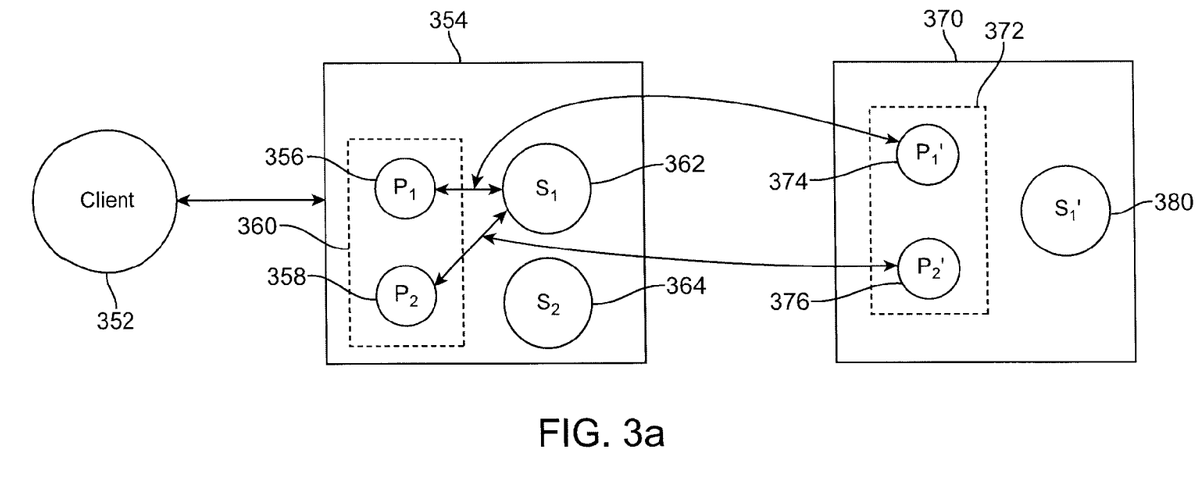
FIGS. 3a and 3b are diagrams showing remote sessions opened at remote computing nodes.

FIG. 3a illustrates a first example scenario that may cause resources to continue to exist at remote computing nodes even after they should be terminated. A client 352 initiates a local session 362 at first server node 354. Session 362 is serviced by process 356 in process pool 360. Process 356 initiates a remote session 380 at second server 370 which is serviced by process 374 in remote process pool 372. Session 362 is also serviced by process 358 in process pool 360 and another process 376 is allocated in remote process pool 372 which services remote session 380.

In certain systems, if process 374 undergoes a failure or non-graceful termination, remote session 380 may still be alive. However, if process 356 undergoes a failure or non-graceful termination while servicing session 362, then session 362 may terminate, but remote session 380 may still be alive. In this circumstance, remote session 380 becomes a zombie that needs to be cleaned up.

Figure 3B:
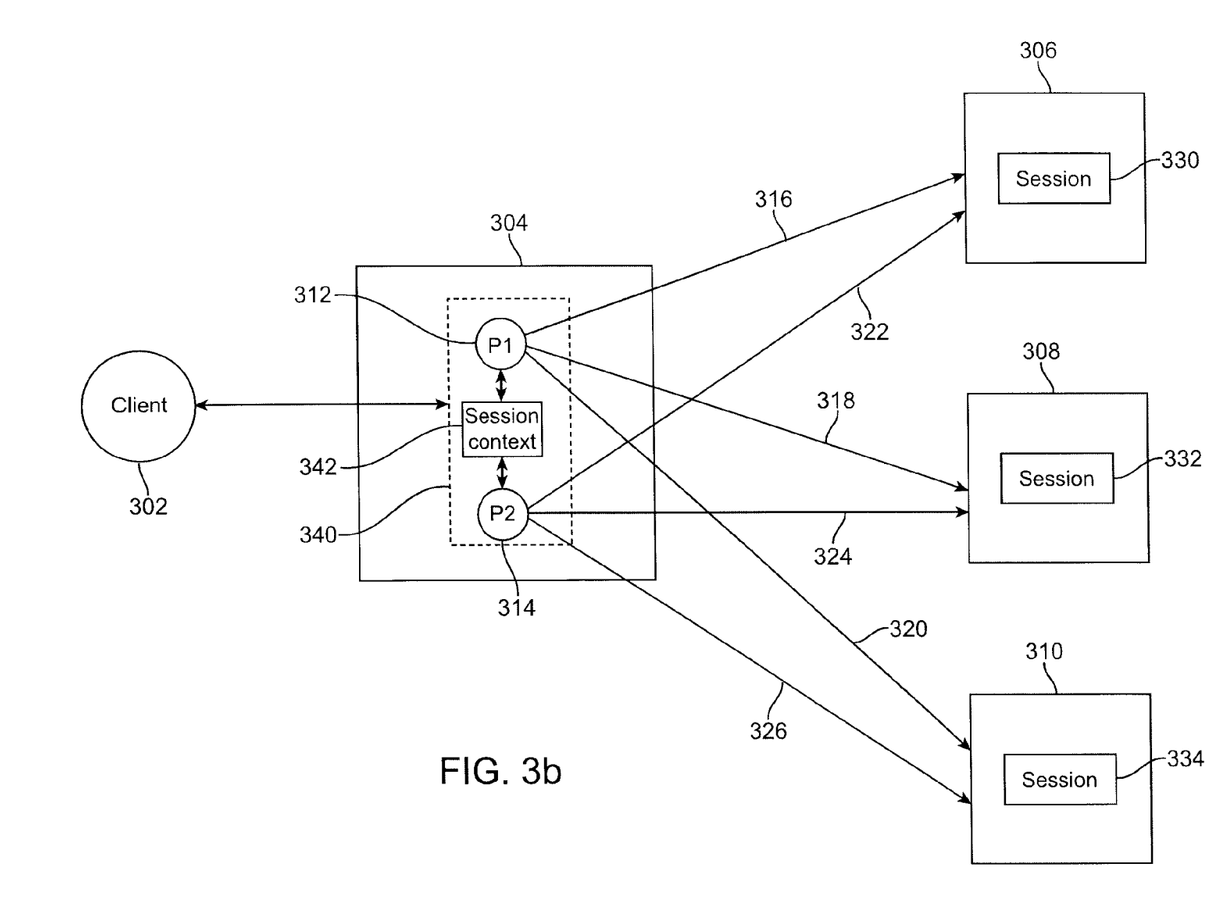

FIG. 3b illustrates a second example scenario that may cause resources to continue to exist at remote computing nodes even after they should be terminated. A client 302 initiates a local session at server node 304 using a process in process pool 340. Shown in this figure are two processes 312 and 314 within process pool 340. A shared session context 342 allows either process 312 or 314 to work on behalf of the local user session.

As part of the work performed at server node 304, the local session may require additional connections to remote server nodes 306, 308, and/or 310. A separate remote session is appropriately established at each relevant remote server node that performs work on behalf of the local session. Thus, a first remote session 330 may be established at remote server node 306, e.g., by process 312 over connection 316 or process 314 over connection 322. A second remote session 332 may be established at remote server node 308, e.g., by process 312 over connection 318 or process 314 over connection 324. Finally, a third remote session 334 may be established at remote server node 310, e.g., by process 312 over connection 320 or process 314 over connection 326. For purposes of this example, it is assumed that remote sessions 330, 332, and 334 are configured in a shared environment, in which the resources associated with each session is de-coupled from the particular connection that initiates the remote session, e.g., using the approach shown in FIG. 2.

If a normal log-out or termination of a local session occurs, then an explicit log-out or termination instruction will be performed at each appropriate remote server node to close an associated remote session. In this way, the resources associated with a remote session will be released/de-allocated, thereby allowing these resources to be used by others at the remote server node.

Consider if the local session at server node 304 undergoes a failure or a non-graceful shutdown, causing the particular connection that connects either process 312 or process 314 to the remote server nodes to abruptly fail. This situation may not allow sufficient time or notice to perform an explicit log-out or termination of any associated remote sessions. Since each remote session is de-coupled from the particular connection that initiates the remote session, it is possible that the remote session will not have its resources appropriately "cleaned up" after the failure. These "zombie" sessions at the remote server nodes could continue consuming valuable system resources, even after their purpose for existence has already ended. It is often undesirable to use a local server entity, e.g., a process monitoring entity, to remotely perform the clean-up since costly network I/O operations may be necessary.

Figure 4:
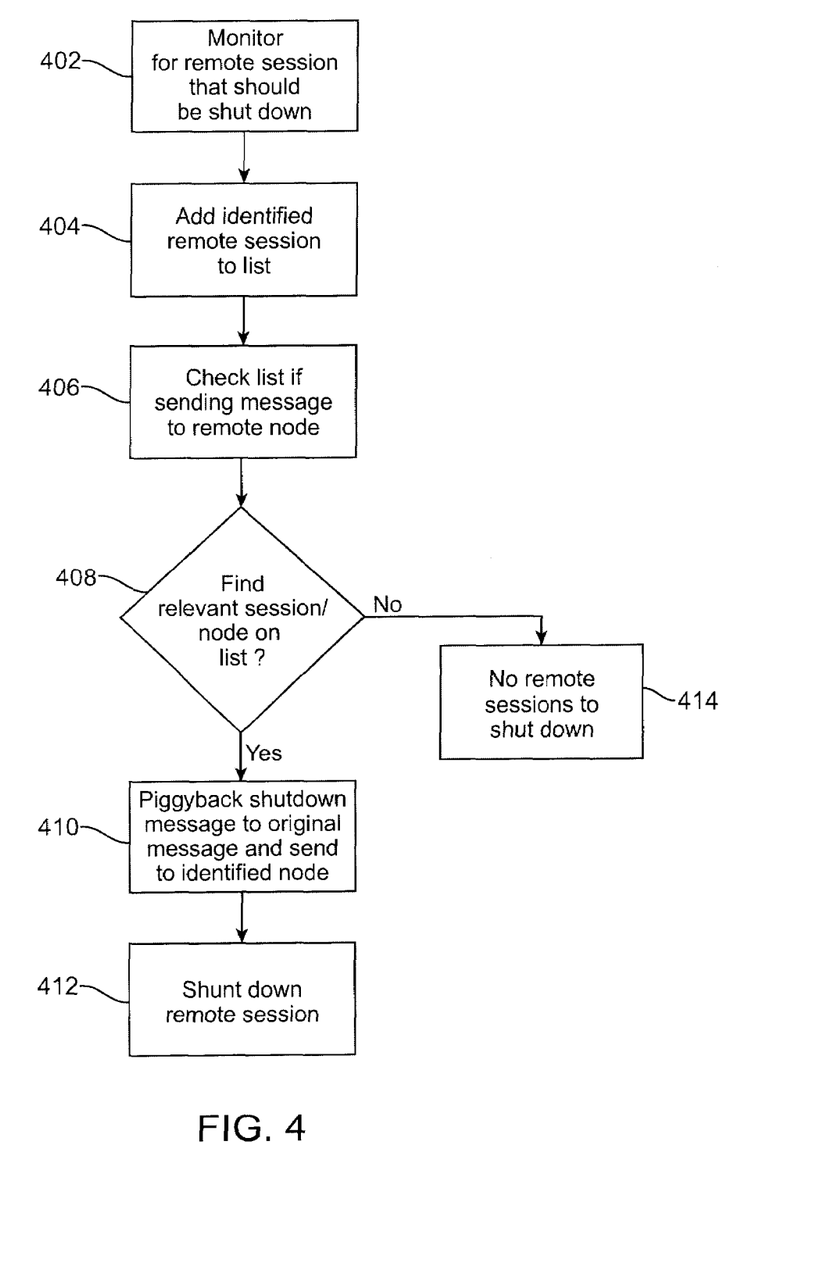
FIG. 4 is a flowchart of a process for de-allocating remote resources according to one embodiment of the invention.

FIG. 4 shows a flowchart of a process for ensuring that the lifetime and resources of a remote session are appropriately ended after the shutdown or failure of a local session, according to one embodiment of the invention. At step 402, monitoring is performed at the local server node to identify any local sessions that undergo abnormal termination or failure. In one embodiment, this action is performed by a process monitor (PMON) that is responsible for tracking the status of various processes associated with an application instance, and which may be responsible for cleaning up the resources of local sessions that exit. The PMON may be configured to track the state of all open connections between the local server node and any remote server nodes. If the monitoring process identifies any local sessions that undergo abnormal termination or failure, then the identified local session is added to a list of such local sessions, e.g., maintaining this list in shared memory (step 404). The type of information that is maintained in this list can include, for example, the identity of the remote session and the identity of the remote server node associated with the remote session.

At a later point, when a process at the local server node seeks to send messages to a remote node, the process will first check this list to determine if the remote server node it wishes to send message to is identified in the list (406 and 408). If so, the process will "piggyback" an additional message to the message that it originally intended to send to the remote node, with the additional message containing an explicit instruction to the remote server node to terminate the remote zombie session and to appropriately release its associated resources (410). The process at the remote server node responsible for cleaning up sessions will receive this piggybacked instruction and take appropriate actions to terminate the zombie session (412).

According to an embodiment, only processes at the local server node that has the appropriate permissions may take the action of terminating remote zombie sessions. For example, the invention can be configured such that any processes within a process pool has sufficient authority to send termination instructions for any local or remote sessions started by any process in the same process pool. In this approach, a separate list of remote zombie sessions is maintained for each process pool, which is only accessible by processes in the corresponding process pool.

Figure 5:
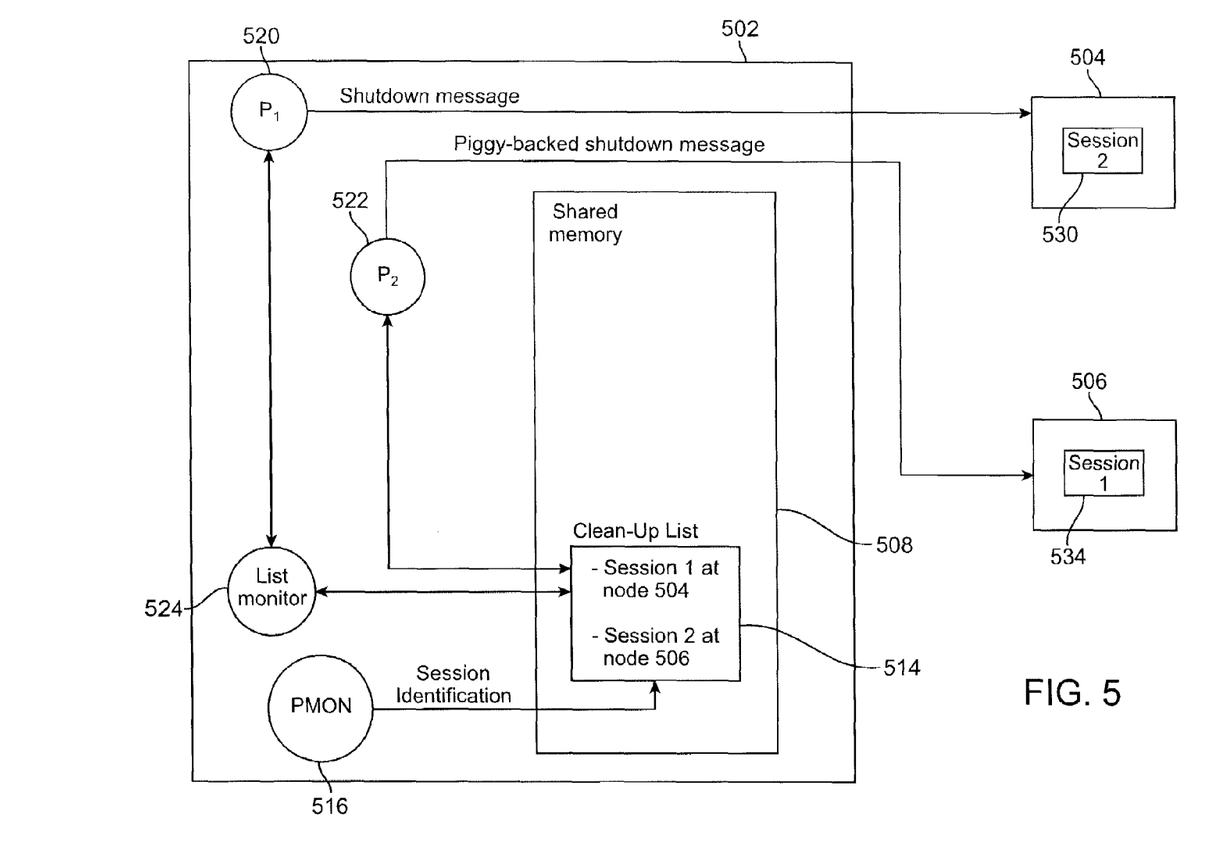
FIG. 5 depicts embodiment(s) of the invention in operation.

FIG. 5 provides an illustrative example for the aspect of the invention shown in FIG. 4. FIG. 5 depicts a local server node 502 that is in communications with a first remote server node 504 and a second remote server node 506. Assume that a local session 510 initiated a remote session 534 at remote server node 506. Further assume that the local session 510 undergoes a failure such that an explicit termination instruction is not sent to terminate the remote session 534 at remote server node 506.

Assume that PMON 516 is a process that is responsible for monitoring the status of local sessions at server node 502. PMON 516 is also responsible for maintaining a clean-up list 514 in shared memory 508 that tracks any remote sessions that should be terminated. When PMON 516 determines that a local session 510 has abnormally terminated, it will add sufficient information to the clean-up list 514 to identify any remote sessions that should be terminated. This type of information may include, for example, the identity of a remote zombie session 534 and its associated remoter server node 506.

At a later point in time, a process 522 may be instructed by another local session to send a message to the same remote server 506. Before sending its intended message, process 522 will first check clean-up list 514 to determine whether that remote server node 506 has a zombie session that should be terminated. If such a zombie session is found in the clean-up list 514, then the process 522 will piggyback a termination message to its original message. The piggybacked termination message is sent to the remote server node 506, to be processed to terminate the remote zombie session 534.

Figure 6:
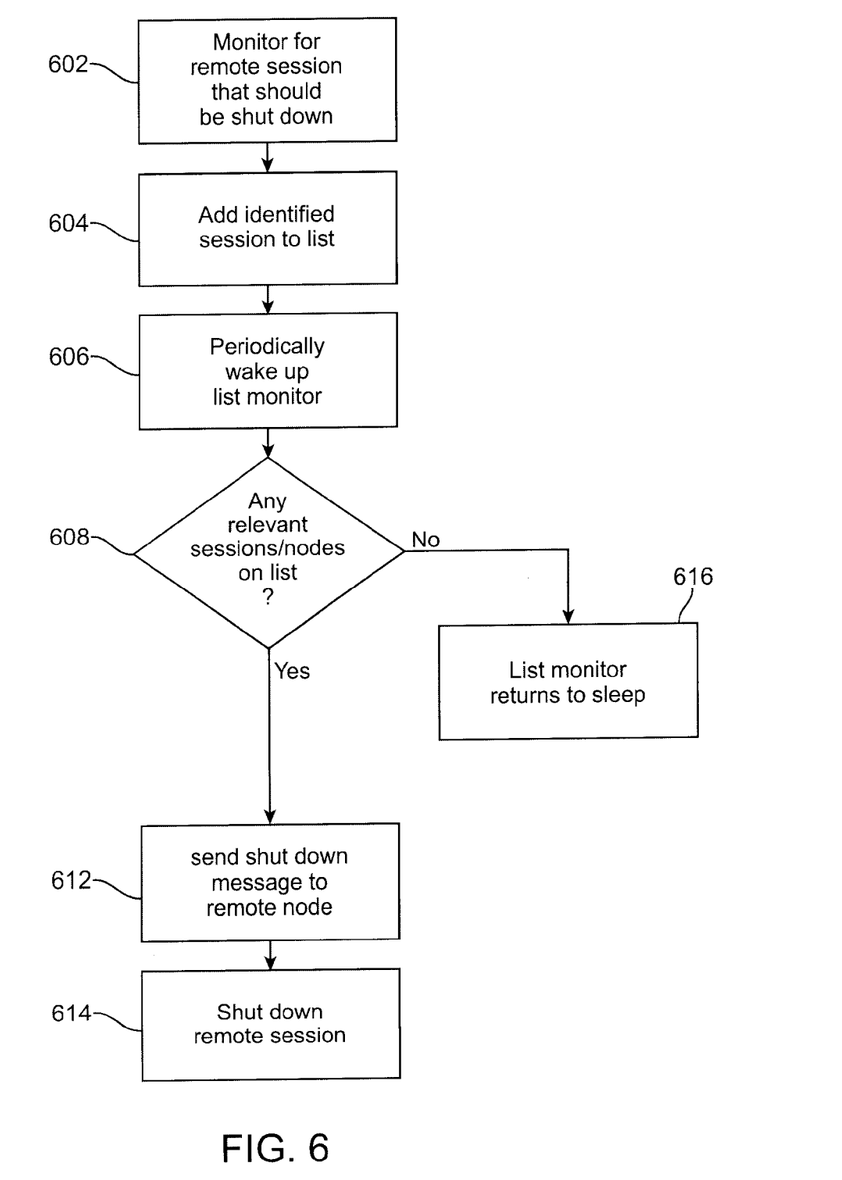
FIG. 6 is a flowchart of an alternate process for de-allocating remote resources according to one embodiment of the invention.

FIG. 6 shows a flowchart of an alternate approach for sending termination messages to remote server nodes. At step 602, a monitoring process again checks for abnormally terminated local sessions that cause remote zombie sessions. If such remote sessions are identified, then the monitoring process adds appropriate information about the remote zombie session to the clean-up list 514 (604).

A list monitoring process may periodically check the clean-up list 514 to identify remote zombies that have been on the clean-up list for too long a period of time (606). A remote zombie session may be on the clean-up list beyond a threshold period of time, for example, if no other process with the correct authority has been instructed to send a message to the remote node associated with the remote zombie session, thereby not providing an earlier opportunity to piggyback a termination message to the remote server node and take the remote session's identify off the clean-up list.

If the list monitoring process identifies such remote zombie sessions that have been on the clean-up list beyond a threshold period of time (608), then the list monitoring process causes an explicit termination message to be sent to the remote server node to terminate the remote zombie session (612). In one embodiment, this occurs by instructing a process in the appropriate process pool to acquire a connection to the remote server node and to send a termination instruction to the entity at the remote server node that is responsible for terminating sessions (614). Alternatively, the list monitoring process can be given sufficient permissions to acquire a connection and to send the termination message. In yet another embodiment, the list monitoring process causes explicit termination messages to be sent for any remote zombies it identifies in the clean-up list, whether or not that remote zombie has been on the clean-up list beyond a certain period of time.

Referring back to FIG. 5, the process of FIG. 6 is illustrated with respect to a second local session 512 that is established at server node 502. Local session 512 initiates a remote session 530 at remote server node 504. Assume that local session 512 abnormally terminates such that an explicit termination instruction is not made to shut down remote session 530, thereby converting remote session 530 into a zombie session.

During its monitoring duties, PMON 516 gains knowledge that local session 512 has abnormally terminated, and that remote session 530 has turned into a zombie session that should be shut down. PMON 516 therefore adds appropriate information about remote session 530 to clean-up list 514. A list monitor process 524 periodically wakes up to check the contents of clean-up list 514. Upon checking the clean-up list 514, list monitor process 524 determines that remote session 530 has been on the list beyond a permitted period of time. List monitor process 524 instructs process 520 to send an explicit termination message to the appropriate entity on remote server node 504. Thereafter, the remote server node 504 terminates remote session 530 to deallocates the session's resources and to make these resources available to be used by others.

System Architecture Overview

Figure 7:
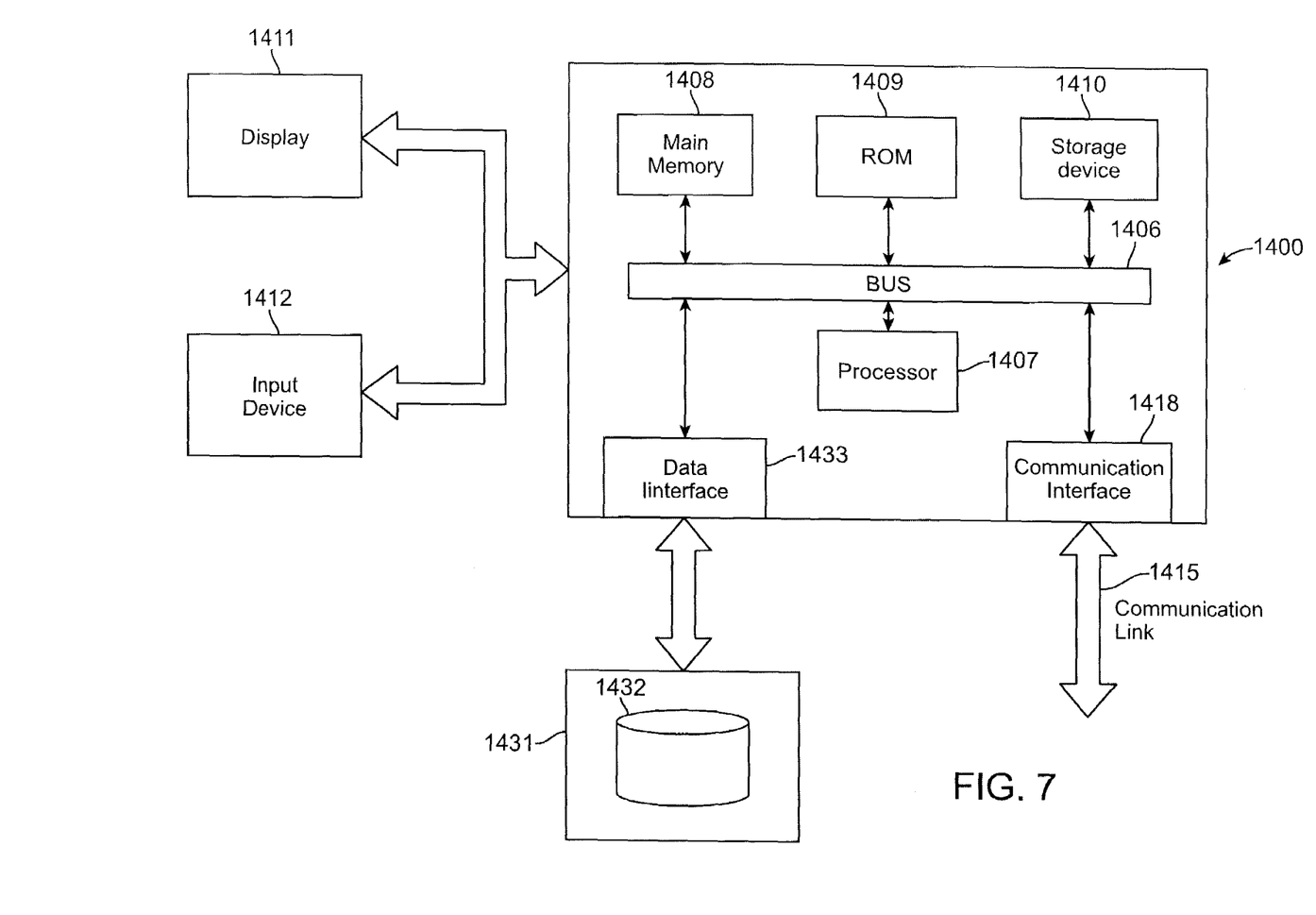
FIG. 7 is a diagram of a system architecture with which the present invention can be implemented.

The execution of the sequences of instructions required to practice the invention may be performed in embodiments of the invention by a computer system 1400 as shown in FIG. 7. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 7, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile; and volatile media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method for deallocating a remote resource after termination of a local resource associated with the remote resource, the local resource residing on a local computing node, the remote resource residing on a remote computing node, in which one of the remote resource and the local resource was initiated by the other, comprising:
   a) monitoring, at the local computing node, for termination of the local resource residing on the local computing node;
   b) determining, at the local computing node, if an abnormal condition is detected wherein termination of the local resource due to the abnormal condition does not result in expected deallocation of the remote resource, in which the remote resource resides on the remote computing node, and one of the local resource and the remote resource was initiated by the other;
c) identifying information about the abnormal condition in one or more lists;
d) checking the one or more lists to identify the remote resource that should be deallocated;
e) causing, by the local computing node, a deallocation message to be sent to the remote computing node to deallocate the remote resource; and
f) causing, by the local computing node, the remote computing node to deallocate the remote resource.

2. The method of claim 1 in which the step (d) is performed by an entity that sends a message to the remote computing node.

3. The method of claim 2 in which the deallocation message is piggybacked to the message.

4. The method of claim 1 in which step (a) is performed by a process monitor.

5. The method of claim 1 in which the one or more lists is maintained in a shared memory region.

6. The method of claim 1 in which the local resource is locally processed by an entity within a first process pool and the deallocation message can be sent only by any process within the first process pool.

7. The method of claim 1 in which a monitoring process performs step (d).

8. The method of claim 7 in which the monitoring process periodically performs step (d).

9. The method of claim 7 in which the monitoring process instructs another process to perform step (e).

10. The method of claim 7 wherein the monitoring process performs step (e).

11. The method of claim 1 wherein the local resource is locally processed by an entity within a first process pool and the deallocation message can be sent by any process on the local computing node.

12. The method of claim 1, further comprising:
adding the abnormal condition to the one or more lists, wherein the abnormal condition is not identified in the one or more lists.

13. The method of claim 1, further comprising:
identifying the remote computing node or the remote resource initiated by the local resource in the one or more lists; and
causing an instruction for releasing the remote resource initiated by the local resource to be sent to the remote computing node.

14. The method of claim 1, in which the information about the abnormal condition comprises a first information of the remote computing node.

15. The method of claim 1, further comprising:
checking the one or more lists to identify a second remote resource residing on the remote computing node which is not initiated by the abnormal condition but should be deallocated; and
causing the remote computing node to deallocate the second remote resource.

16. A method for coordinating the lifetime of a remote session at a remote computing node to the lifetime of a local session at a local computing node, in which the remote session is de-coupled from a specific connection between the remote computing node and the local computing node, comprising:

a) monitoring, at the local computing node, for termination of the local session residing on the local computing node, in which the local session was initiated by a process in a process pool;
b) determining if the termination of the local session was abnormal so as to cause the remote session not to have appropriately terminated, in which the remote session resides on the remote computing node and was initiated by the local session; and
c) causing by the local computing node a deallocation message to be sent to the remote computing node to release the inappropriately terminated remote session associated with the abnormally terminated local session, in which the action of causing a deallocation message to be sent is performed by a process at the local computing node.

17. The method of claim 16 further comprising the step of terminating the remote session.

18. The method of claim 17 further comprising the step of deallocating resources associated with the remote session.

19. The method of claim 16 in which the deallocation message is piggybacked to another message sent to the remote computing node.

20. The method of claim 16 in which the local and remote sessions are database sessions.

21. The method of claim 16 further comprises:
maintaining one or more lists to track remote sessions that should be terminated.

22. The method of claim 21 in which a monitoring process periodically checks the one or more lists.

23. The method of claim 22 in which the monitoring process instructs another process to perform step (c).

24. The method of claim 22 wherein the monitoring process performs step (c).

25. A computer program product comprising a computer storage medium having executable code to execute a method for deallocating a remote resource after termination of a local resource associated with the remote resource, the local resource residing on a local computing node, the remote resource residing on a remote computing node, in which the remote resource was initiated by the local resource, the method comprising the steps of:

a) monitoring, at the local computing node, for termination of the local resource residing on the local computing node;
b) determining, at the local computing node, if an abnormal condition is detected wherein termination of the local resource due to the abnormal condition does not result in expected deallocation of the remote resource, in which the remote resource resides on the remote computing node, and one of the local resource and the remote resource was initiated by the other;
c) identifying information about the abnormal condition in one or more lists;
d) checking the one or more lists to identify the remote resource that should be deallocated;
e) causing, by the local computing node, a deallocation message to be sent to the remote computing node to deallocate the remote resource; and
f) causing, by the local computing node, the remote computing node to deallocate the remote resource.

26. The computer program product of claim 25 in which the deallocation message is piggybacked on to another message.

27. The computer program product of claim 25 in which the local resource is processed by an entity within a first process pool and the deallocation message can be sent only by any process within the first process pool.

28. The computer program of claim 25 in which a monitoring process performs step (d) and instructs another process to perform step (e).

29. The computer program product of claim 25 wherein a monitoring process performs step (d) and step (e).

30. A computer program product comprising a computer storage medium having executable code to execute a method for coordinating the lifetime of a remote session at a remote computing node to the lifetime of a local session at a local computing node, in which the remote session is de-coupled from a specific connection between the remote computing node and the local computing node, the method comprising the steps of:
   a) monitoring, at the local computing node, for termination of the local session residing on the local computing node, in which the local session was initiated by a process in a process pool;
   b) determining if the termination of the local session was abnormal such that the remote session has not appropriately terminated, in which the remote session resides on the remote computing node and was initiated by the local session;
   c) causing by the local computing node a deallocation message to be sent to the remote computing node to release the remote session associated with the abnormally terminated local session, in which the action of causing a deallocation message to be sent is performed by a process at the local computing node.

31. The computer program product of claim 30 in which the deallocation message is piggybacked to another message sent to the remote computing node.

32. The computer program product of claim 30 in which one or more lists are maintained to track remote sessions that should be terminated.

33. The computer program product of claim 32 in which a monitoring process checks the one or more lists and instructs another process to perform step (c).

34. The computer program product of claim 32 wherein a monitoring process checks the one or more lists and performs step (c).

35. A system for deallocating a remote resource after termination of a local resource associated with the remote resource, the local resource residing on a local computing node, the remote resource residing on a remote computing node, in which the remote resource was initiated by the local resource, comprising:
   a) means for monitoring, at the local computing node, for termination of the local resource residing on the local computing node;
   b) a processor for determining if an abnormal condition is detected at the local computing node wherein termination of the local resource due to the abnormal condition does not result in expected deallocation of the remote resource, in which the remote resource resides on the remote computing node, and one of the local resource and the remote resource was initiated by the other;
   c) means for identifying information about the abnormal condition in one or more lists;
   d) means for checking the one or more lists to identify the remote resource that should be deallocated;
   e) means for causing, by the local computing node, a deallocation message to be sent to the remote computing node to deallocate the remote resource; and
   f) means for causing, by the local computing node, the remote computing node to deallocate the remote resource.

36. The system of claim 35 in which the deallocation message is piggybacked on to another message.

37. The system of claim 35 in which the means for checking the one or more lists and the means for causing a deallocation message to be sent are performed by different entities.

38. A system for coordinating the lifetime of a remote session at a remote computing node to the lifetime of a local session at a local computing node, in which the remote session is de-coupled from a specific connection between the remote computing node and the local computing node, the method comprising the steps of:
   a) means for monitoring, at the local computing node, for termination of the local session residing on the local computing node, in which the local session was initiated by a process in a process pool;
   b) a processor for determining if the termination of the local session was abnormal such that the remote session has not appropriately terminated, in which the remote session resides on the remote computing node and was initiated by the local session; and
   c) means for causing by the local computing node a deallocation message to be sent to the remote computing node to release the remote session associated with the abnormally terminated local session, in which the action of causing a deallocation message to be sent is performed by a process at the local computing node.

39. The system of claim 38 in which the deallocation message is piggybacked on to another message.

40. The system of claim 38 in which the means for determining and the means for causing a deallocation message are performed by different entities.

* * * * *

UNITED STATES PATENT AND TRADEMARK OFFICE
CERTIFICATE OF CORRECTION

PATENT NO. : 7,386,615 B1
APPLICATION NO. : 10/144246
DATED : June 10, 2008
INVENTOR(S) : Surlaker et al.

It is certified that error appears in the above-identified patent and that said Letters Patent is hereby corrected as shown below:

On Sheet 5 of 8, Figure 4, Box 412, line 1, delete "Shunt" and insert -- Shut --, therefor.

On Sheet 8 of 8, Figure 7, Box 1433, line 2, delete "linterface" and insert -- Interface --, therefor.

In column 5, line 64, delete "remoter" and insert -- remote --, therefor.

In column 5, line 67, after "server" insert -- node --.

In column 8, line 35, after "non-volatile" delete ";".

Signed and Sealed this

Seventh Day of July, 2009

JOHN DOLL
*Acting Director of the United States Patent and Trademark Office*